Oct. 10, 1933.  W. M. FORSYTHE  1,930,005
WIRE STRETCHER
Filed Aug. 4, 1933
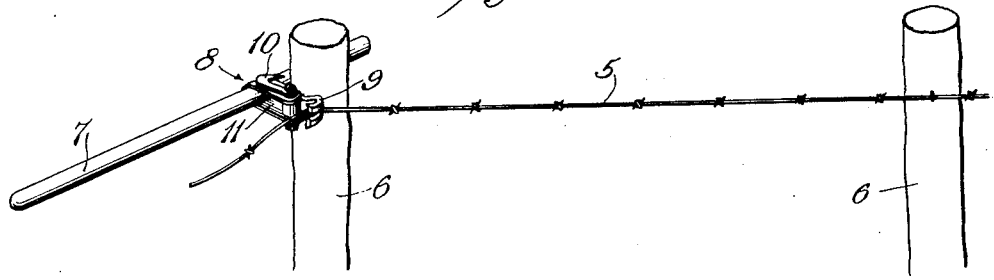
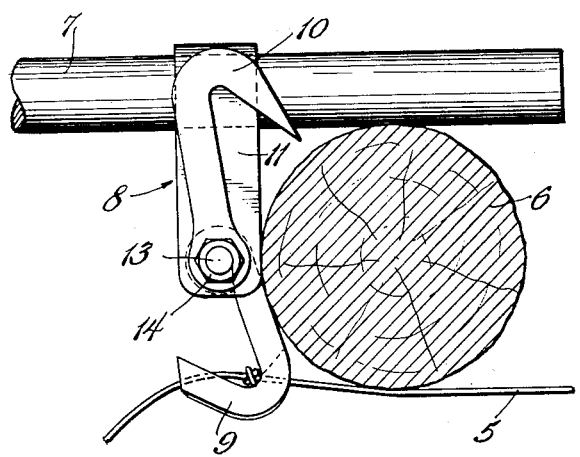
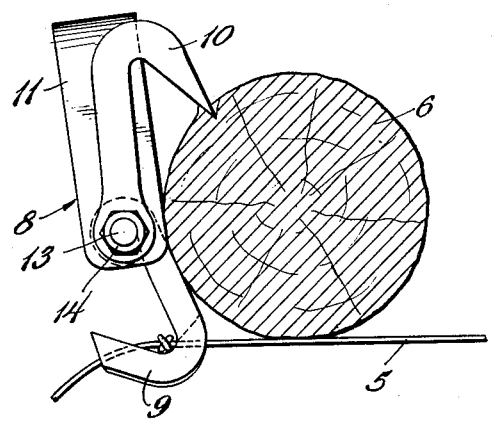
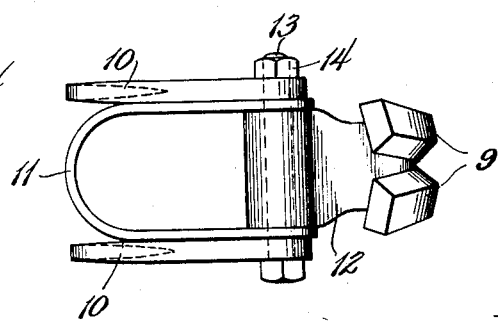
Inventor
Wm. M. Forsythe
By Philip P. Siggers  Attorney Patented Oct. 10, 1933

1,930,005

UNITED STATES PATENT OFFICE 1,930,005

WIRE STRETCHER

William M. Forsythe, Dubach, La., assignor of one-fourth to Homer Cleveland Miller, Bernice, La.

Application August 4, 1933. Serial No. 683,694

4 Claims. (Cl. 254—77)

This invention relates to implements for stretching barb wire and other wire fencing, and among other objects, aims to provide a simple, practical device which will grip the wire and may also be operated so as to grip a fence post, to hold the wire taut, without the necessity of a continuous lever pull on the wire, until the wire is secured by the usual staples. The invention has other objects which will appear from the following description of a preferred embodiment thereof.

In the accompanying drawing,—

Fig. 1 is a perspective view showing the implement in use;

Fig. 2 is a plan view, on a larger scale, showing the implement in use, the fence post being in section and only a small portion of the lever being shown;

Fig. 3 is a similar view, omitting the lever and showing the prongs of the implement engaged with the fence post;

Fig. 4 is an elevation of the implement without the lever.

Referring particularly to the drawing, there is shown a strand of barb wire 5 and portions of two fence posts 6, which will be illustrative of a new fence in the process of erection, or an old fence being strung with new wire, whether barb wire or some other kind of steel wiring.

The implement embodying the invention comprises two principal parts, namely, a lever 7 (which may be a crowbar, an implement handle or almost any stout stick which may be handy) and a device 8 having claws 9 for gripping the wire 5, prongs 10 for engaging the fence post and a loop 11 through which the lever is thrust when the wire is to be stretched. Preferably the claws 9 are similar to the claws of a hammer, except that they have blunt ends as shown. The prongs 10 preferably have very sharp ends and are parallel to each other, being outside the arms of the V-shaped loop 11.

While the device 8 may be made in several ways, I prefer to make the claws 9 a part of a casting 12 having a bore through which a central assembling bolt 13 is thrust. The prongs 10 are also carried on said bolt, which serves as an axis for them, and for the loop 11. The single nut 14 thus holds all the parts together: thus assembly and disassembly are facilitated.

When the implement is used, the wire is thrust between the claws 9 and the lever is thrust through loop 11 and swung against the side of a fencepost, as shown in Fig. 2. This puts the wire under a tension which may be regulated by the pull on the end of the lever. The prongs 10 are then free of the fencepost, but a light tap with a stone or hammer, or even a push with the heel of the hand, will cause them to bite into a wooden fencepost, and when pressure on the lever is removed, the tension in the wire will force the prongs deeply into the wood, the parts then assuming the position of Fig. 3. The lever may now be removed entirely and carried to the next location where it will be used. The device 8 will continue to hold the wire taut until the wire is secured by the usual staples. When this has been accomplished, a light tap on the claw ends will disengage the device from the fencepost, and it is ready for use at the next location.

Quite obviously, the device is very simple to operate, is strong, durable and inexpensive to manufacture, with nothing to get out of order, yet it is very effective for its purpose.

It will be clear that the invention may be embodied in a number of forms, within the scope of the appended claims.

Having described the preferred embodiment of my invention, what I claim as new and desire to secure by Letters Patent is:—

1. An implement of the class described comprising, in combination, a pair of converging claws between which a wire may be gripped; a pair of bent prongs having sharp ends for engaging the side of a fencepost; a loop through which a lever may be thrust; and means to unite the claws, prongs and loop.

2. An implement of the class described comprising, in combination, a pair of converging claws projecting from a body; a pair of prongs pivotally connected to said body and having points extending in an opposite direction to that of the claw ends; and a loop connected to said body and through which a lever may be thrust, said loop being so arranged that the lever may pass between the prongs.

3. An implement of the class described comprising a body having integral claws; a loop pivotally mounted on the body to extend there from on the opposite side of the pivot; and a pair of bent prongs pivotally mounted on opposite sides of the loop but on the same side of the pivot as said loop; the loop being so made as to permit a stick to be thrust through it; the prongs being so made that they will freely pass a stick thrust through the loop, and being freely swingable independently of the loop or the claws to engage the side of a fencepost.

4. An implement of the class described comprising in combination, a body having wire-holding claws and a transverse bore; a bolt passed through said bore; a V-shaped loop having the ends of its arms pivoted on said bolt outside said body; and a pair of bent, sharp pointed prongs also pivoted on the bolt, outside of the arms of said loop.

WILLIAM M. FORSYTHE.